US009146745B2

(12) United States Patent
Jourdan et al.

(10) Patent No.: US 9,146,745 B2
(45) Date of Patent: Sep. 29, 2015

(54) METHOD AND APPARATUS FOR PARTITIONED PIPELINED EXECUTION OF MULTIPLE EXECUTION THREADS

(75) Inventors: Stephan Jourdan, Portland, OR (US); Robert Hinton, Hillsborough, OR (US)

(73) Assignee: Intel Corporation, Santa Clara, CA (US)

( * ) Notice: Subject to any disclaimer, the term of this patent is extended or adjusted under 35 U.S.C. 154(b) by 757 days.

(21) Appl. No.: 11/479,245

(22) Filed: Jun. 29, 2006

(65) Prior Publication Data

US 2008/0005544 A1    Jan. 3, 2008

(51) Int. Cl.
G06F 9/38    (2006.01)

(52) U.S. Cl.
CPC ............ *G06F 9/3851* (2013.01); *G06F 9/3802* (2013.01); *G06F 9/3804* (2013.01); *G06F 9/3844* (2013.01)

(58) Field of Classification Search
CPC ....... G06F 9/3806; G06F 9/3844; G06F 9/50; G06F 9/505
USPC ....................................................... 712/220
See application file for complete search history.

(56) References Cited

U.S. PATENT DOCUMENTS

| | | | | |
|---|---|---|---|---|
| 5,574,871 A | * | 11/1996 | Hoyt et al. | 712/200 |
| 5,933,627 A | * | 8/1999 | Parady | 712/228 |
| 5,978,909 A | * | 11/1999 | Lempel | 712/240 |
| 6,154,833 A | * | 11/2000 | Murty et al. | 712/238 |
| 6,427,192 B1 | * | 7/2002 | Roberts | 711/133 |
| 6,438,673 B1 | | 8/2002 | Jourdan et al. | |
| 6,640,297 B1 | * | 10/2003 | Banning et al. | 712/238 |
| 2002/0087850 A1 | | 7/2002 | Jourdan et al. | |
| 2002/0087852 A1 | | 7/2002 | Jourdan et al. | |
| 2003/0018883 A1 | | 1/2003 | Jourdan | |
| 2003/0065912 A1 | | 4/2003 | Hum et al. | |
| 2003/0131195 A1 | | 7/2003 | Jourdan et al. | |
| 2004/0193857 A1 | | 9/2004 | Miller et al. | |
| 2005/0071614 A1 | | 3/2005 | Jourdan et al. | |
| 2005/0132174 A1 | | 6/2005 | Jourdan et al. | |
| 2005/0138341 A1 | | 6/2005 | Maiyuran et al. | |

(Continued)

OTHER PUBLICATIONS

Shen et al. ("A Buffer-Oriented Methodology for Microarchitecture Validation"). Journal of Electronic Testing, Jul. 7, 1999. pp. 49-65.*

(Continued)

*Primary Examiner* — Eric Coleman
(74) *Attorney, Agent, or Firm* — Nicholson De Vos Webster & Elliot LLP (57) ABSTRACT

Methods and apparatus for partitioning a microprocessor pipeline to support pipelined branch prediction and instruction fetching of multiple execution threads. A thread selection stage selects a thread from a plurality of execution threads. In one embodiment, storage in a branch prediction output queue is pre-allocated to a portion of the thread in one branch prediction stage in order to prevent stalling of subsequent stages in the branch prediction pipeline. In another embodiment, an instruction fetch stage fetches instructions at a fetch address corresponding to a portion of the selected thread. Another instruction fetch stage stores the instruction data in an instruction fetch output queue if enough storage is available. Otherwise, instruction fetch stages corresponding to the selected thread are invalidated and refetched to avoid stalling preceding stages in the instruction fetch pipeline, which may be fetching instructions of another thread.

23 Claims, 9 Drawing Sheets

(56) References Cited

U.S. PATENT DOCUMENTS

| | | |
|---|---|---|
| 2005/0149707 A1 | 7/2005 | Jourdan et al. |
| 2005/0149709 A1 | 7/2005 | Jourdan |
| 2005/0193278 A1 | 9/2005 | Hammarlund et al. |
| 2006/0095750 A1* | 5/2006 | Nye et al. ..................... 712/240 |

OTHER PUBLICATIONS

Merriam-Webster Dictionary: "Allocate" definition. 1 page.*

Yankelevsky et al. "alpha-Coral: A Multigrain, Multithreading Processor Architecture". 2001, pp. 358-367.*

Notice to Grant Patent Right for Invention from counterpart Foreign Patent Application No. 200710127963, mailed Jan. 29, 2010, 4 pages, (Translation included).

First Office Action from counterpart Foreign Patent Application No. 200710127963, mailed Sep. 5, 2008, 12 pages, (Translation included).

First Office Action from counterpart Foreign Patent Application No. 200710127963, mailed Jun. 19, 2009, 12 pages, (Translation included).

* cited by examiner

METHOD AND APPARATUS FOR PARTITIONED PIPELINED EXECUTION OF MULTIPLE EXECUTION THREADS

FIELD OF THE DISCLOSURE

This disclosure relates generally to the field of microprocessors. In particular, the disclosure relates to partitioning a microprocessor pipeline to support pipelining of multiple execution threads.

BACKGROUND OF THE DISCLOSURE

Computing systems and microprocessors frequently support multiprocessing, for example, in the form of multiple processors, or multiple cores within a processor, or multiple software processes or threads (historically related to co-routines) running on a processor core, or in various combinations of the above.

In modern microprocessors, many techniques are used to increase performance. Pipelining is a technique for exploiting parallelism between different instructions that have similar stages of execution. These stages are typically referred to, for example, as instruction-fetch, decode, operand-read, execute, write-back, etc. By performing work for multiple pipeline stages in parallel for a sequence of instructions the effective machine cycle time may be reduced and parallelism between the stages of instructions in the sequence may be exploited. In some modern microprocessors, these stages may also be divided into increasingly smaller time slices to further reduce the effective machine cycle time.

Branch prediction is another technique used to increase performance. When a branch instruction occurs in a sequence of instructions, the outcome of the branch decision may not be known until the branch instruction is executed in one of the later pipeline stages. Thus bubbles may be introduced into the pipeline until it is determined which branch target instructions need to be fetched. Rather than waiting until the outcome of the branch decision is known, the branch may be predicted as taken or not taken, and instructions of the predicted target may be fetched from memory, thus reducing bubbles in the pipeline.

The technique of executing multiple software processes or threads on a microprocessor may also be used to reduce the occurrence of bubbles in a pipeline. For example, when an instruction cache miss occurs for one particular execution thread, instructions from another execution thread may be fetched to fill the pipeline bubbles that would otherwise have resulted from waiting for the missing cache line to be retrieved from external memory.

On the other hand, conditions such as the exhaustion of some particular type of internal microprocessor resources may cause one of more of the pipeline stages to stall. While one execution thread is stalled in the pipeline, progress of other threads in the pipeline may also be blocked, thus reducing the effectiveness of executing multiple threads on a pipelined microprocessor.

BRIEF DESCRIPTION OF THE DRAWINGS

The present invention is illustrated by way of example and not limitation in the figures of the accompanying drawings.

DETAILED DESCRIPTION

Methods and apparatus are disclosed below for partitioning a microprocessor pipeline to support pipelined branch prediction and instruction fetching of multiple execution threads. A thread selection stage of the pipeline selects a thread from a plurality of execution threads. In one embodiment, storage in a branch prediction output queue for the selected thread is pre-allocated to a portion of the thread in one of the branch prediction pipeline stages in order to prevent stalling of any subsequent stages in the branch prediction pipeline. In another embodiment, one of the instruction fetch pipeline stages fetches instructions at a fetch address corresponding to a portion of the selected thread. Another of the instruction fetch stages stores the instruction data in an instruction fetch output queue if enough storage is available. Otherwise, if enough storage is not available for the selected thread, the instruction fetch pipeline stages corresponding to that thread are invalidated and refetched to avoid stalling any preceding stages in the instruction fetch pipeline, which may be fetching instructions of another thread. Alternative embodiments may employ portions of either or both techniques to prevent one thread from blocking the progress of another thread in a branch prediction pipeline and/or an instruction fetch pipeline.

These and other embodiments of the present invention may be realized in accordance with the following teachings and it should be evident that various modifications and changes may be made in the following teachings without departing from the broader spirit and scope of the invention. It will be appreciated that while embodiments of a branch prediction pipeline and/or an instruction fetch pipeline are illustrated as examples of pipeline structures that benefit from the disclosed techniques, other pipeline structures may also make use of such techniques teachings without departing from the broader spirit and scope of the invention. The specification and drawings are, accordingly, to be regarded in an illustrative rather than restrictive sense and the invention measured only in terms of the claims and their equivalents. Additionally, some well known structures, circuits, and the like have not been shown in detail to avoid unnecessarily obscuring the present invention.

For the purpose of the following discussion a computing system may refer to a single microprocessor capable of executing co-routines or software execution threads that may or may not communicate and/or synchronize their execution. A computing system may also refer to multiple processors capable of executing such software execution threads or to microprocessor(s) capable of executing multiple such software execution threads simultaneously and/or concurrently. Such microprocessor(s) may be of any number of architectural families and may further comprise multiple logical cores each capable of executing one or more of such software execution threads.

Figure 1:
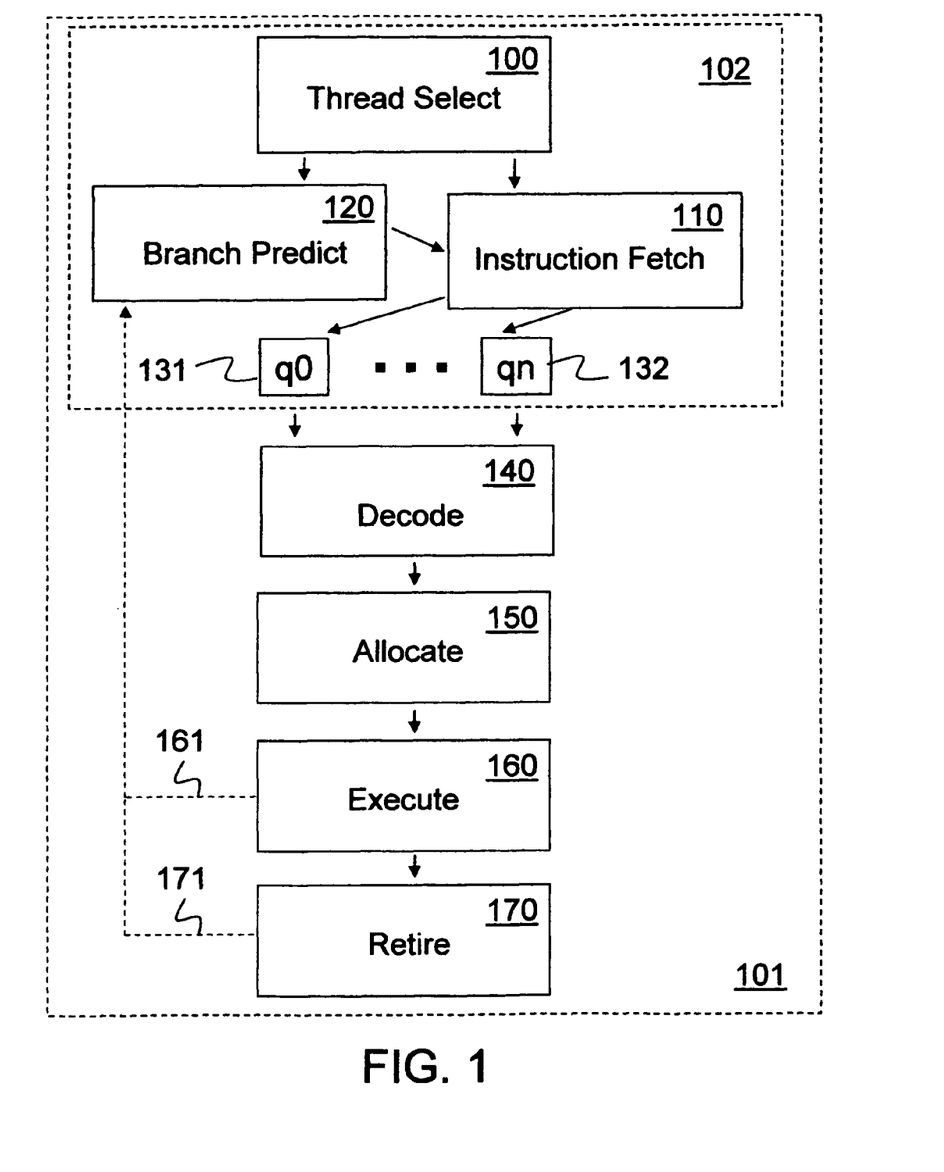
FIG. 1 illustrates one embodiment of a microprocessor pipeline to support pipelined branch prediction and instruction fetching of multiple execution threads.

FIG. 1 illustrates one embodiment of a microprocessor pipeline 101 to support pipelined branch prediction and instruction fetching of multiple execution threads. It will be appreciated that in FIG. 1 and in other figures the illustrated pipeline may be simplified in order to provide a clear example and to avoid unnecessarily obscuring the embodiment(s) of the invention being presented in the figure.

For example, an illustrated pipeline stage may represent multiple actual pipeline stages or where two or more illustrated pipeline stages can be executed concurrently they may be combined into the same pipeline stage in a particular implementation or embodiment. It will also be understood that while the function of a particular pipeline stage may be explained with reference to a particular portion of a particular thread, a pipeline actually works to perform such functions on many such portions of one or more threads concurrently.

With regard to FIG. 1, embodiments of microprocessor pipeline 101 may include pipelined branch prediction and instruction fetching logic 102 comprising a thread selection pipeline stage 100 to select an execution thread from a plurality of execution threads, a branch prediction pipeline 120 to pre-allocate storage in a branch prediction output queue, the pre-allocation of storage corresponding to a portion of the selected execution thread in order to prevent stalling of subsequent stages in the branch prediction pipeline 120. Pipelined branch prediction and instruction fetching logic 102 further comprises an instruction fetch pipeline 110 to fetch instruction data at a fetch address corresponding to a portion of the selected execution thread and to store the instruction data at a storage location corresponding to the portion of the selected execution thread in instruction fetch output queues 131-132 if sufficient storage at that storage location is available. If sufficient storage is not available, instruction fetch pipeline 110 initiates invalidation of instruction fetch pipeline stages corresponding to the selected execution thread and refetches the instruction data at that fetch address in order to avoid stalling of a preceding stage in instruction fetch pipeline 710.

Embodiments of microprocessor pipeline 101 may also include decode logic 140 to decode instructions in instruction fetch output queues 131-132 according to a sequential instruction ordering into micro-operations representing the sequential instruction ordering, allocation logic 150 to allocate execution resources to the micro-operations, execution logic 160 to execute the micro-operations and retirement logic 170 to retire the micro-operations in accordance with the sequential instruction ordering they represent. For some embodiments of microprocessor pipeline 101, retirement logic 170 and/or execution logic 160 may be coupled with branch prediction pipeline 120 to update a dynamic prediction for a micro-operation as it is retired.

The operation of microprocessor pipeline 101 and, in particular, of pipelined branch prediction and instruction fetching logic 102 is presented in greater detail below especially with regard to FIGS. 3-5, 6a and 6b.

Figure 2A:
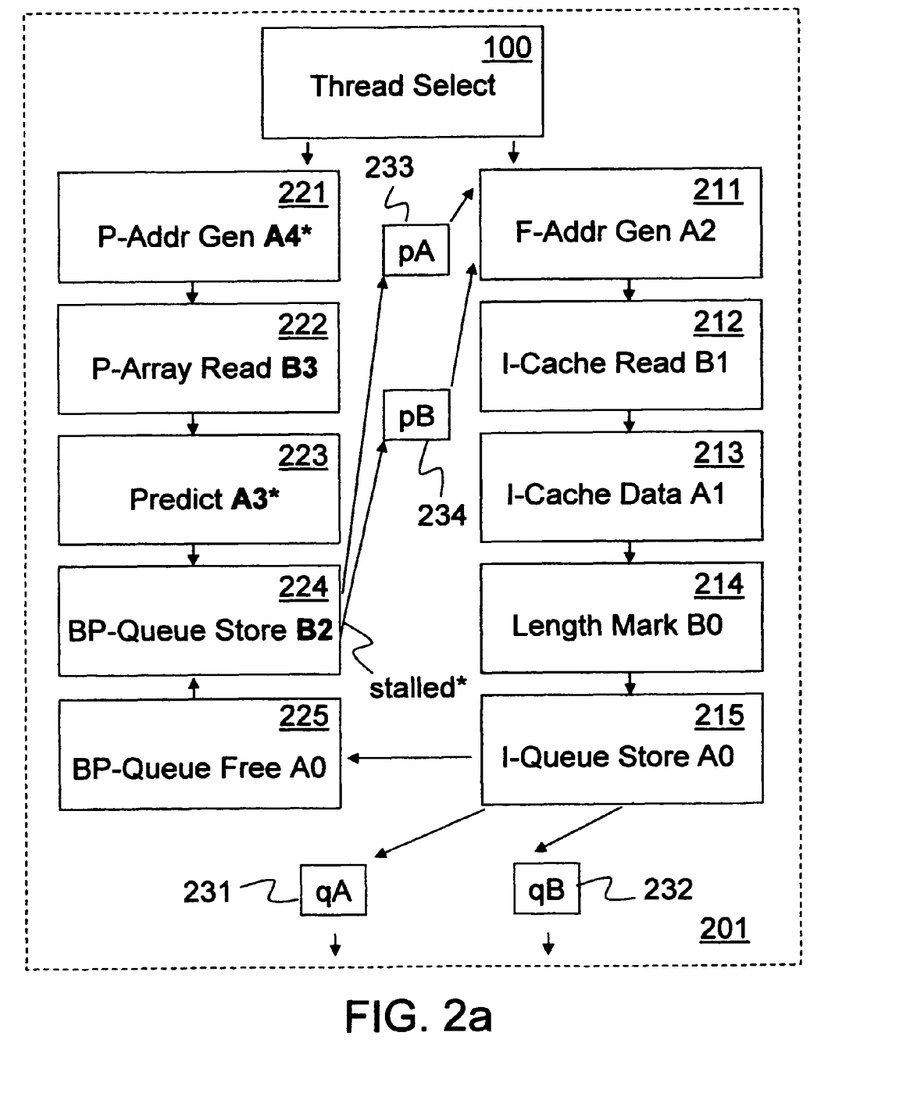
FIG. 2a illustrates an example of a blocked thread occurrence in pipelined branch prediction of multiple execution threads.

FIG. 2a illustrates an example 201 of a blocked thread occurrence in pipelined branch prediction of multiple execution threads.

The pipelined branch prediction of apparatus 201 may comprise thread select stage 100 to select an execution thread from a plurality of execution threads, P-address generation stage 221 to generate a prediction address corresponding to a portion of the selected execution thread, P-array read stage 222 to read the prediction array data for the prediction address, predict stage 223 to generate a branch prediction from the prediction array data for the prediction address; and BP-queue store stage 224 to store the branch prediction in the branch prediction output queues 233 and 234. In this example, prediction output queue 233 holds predictions, pA, corresponding to thread A. Prediction output queue 234 holds predictions, pB, corresponding to thread B.

It will be appreciated that since storage in the branch prediction output queues 233-234 is not pre-allocated, the pipelined branch prediction of apparatus 201 may stall in BP-queue store stage 224 until storage in the branch prediction output queues 233-234 for the corresponding execution thread is freed in BP-queue free stage 225 in response to I-queue store stage 215 successfully storing instruction data for the corresponding execution thread in instruction fetch output queues 231-232.

The operation of the instruction fetch pipeline is presented in greater detail below with regard to the example presented in FIG. 2b.

For the purpose of this example, portions of thread A are denoted A0-A4 (portions of thread B are denoted B0-B3) and appear in the relevant pipeline stages. In other words, the portion of thread A labeled A0 has progressed to instruction fetch pipeline stage 215, the portion of thread B labeled B0 has progressed to instruction fetch pipeline stage 214, etc.

In particular, the portion of thread B labeled B2 has progressed to branch prediction pipeline stage 224, where it is stalled because the branch prediction output queue 234 is full. The portion of thread A labeled A3 has progressed to branch prediction pipeline stage 223, and the portion of thread A labeled A4 has progressed to branch prediction pipeline stage 221, where their progress is blocked by thread B being stalled in branch prediction pipeline stage 224. Thus, the progress of one or more threads may be blocked in the branch prediction pipeline by a completely different thread being stalled. Such blocked thread occurrences may reduce the effective performance of the branch prediction pipeline.

Figure 2B:
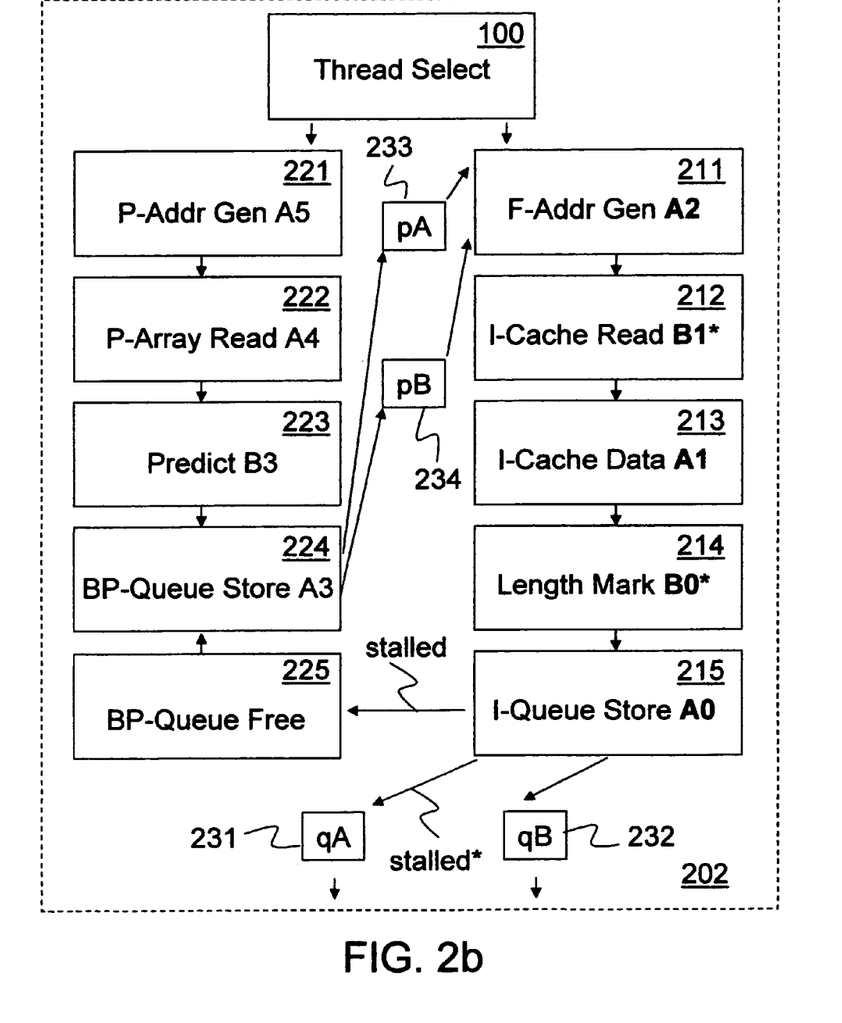
FIG. 2b illustrates an example of a blocked thread occurrence in pipelined instruction fetching of multiple execution threads.

FIG. 2b illustrates an example 202 of a blocked thread occurrence in pipelined instruction fetching of multiple execution threads.

The pipelined instruction fetching of apparatus 202 may comprise thread select stage 100 to select an execution thread from a plurality of execution threads, F-address generation stage 211 to generate a fetch address corresponding to a portion of the selected execution thread, I-cache read stage 212 to access the instruction cache at the corresponding fetch address, I-cache data stage 213 to receive instruction data for the fetch address, length mark stage 214 to mark a length corresponding to the portion of the selected execution thread, and I-queue store stage 215 to store the instruction data in one of the instruction fetch output queues 231 and 232 for the corresponding execution thread if sufficient storage is available. In this example, instruction fetch output queue 231 holds instructions, qA, corresponding to thread A. Instruction fetch output queue 232 holds instructions, qB, corresponding to thread B.

It will be appreciated that if sufficient storage in the corresponding instruction fetch output queue is not available, the pipelined instruction fetching of apparatus 202 may stall in pipeline stage 215 until sufficient storage in the corresponding instruction fetch output queue becomes available.

As in the example of FIG. 2a, portions of thread A are denoted A0-A5 (portions of thread B are denoted B0-B3) and appear in the relevant pipeline stages.

In particular, the portion of thread A labeled A0 has progressed to instruction fetch pipeline stage 215, where it is stalled because the instruction fetch output queue 231 is full. The portion of thread B labeled B0 has progressed to instruction fetch pipeline stage 214, and the portion of thread B labeled B1 has progressed to instruction fetch pipeline stage 212, where their progress is blocked by thread A being stalled in instruction fetch pipeline stage 215. Thus, the progress of one or more threads may also be blocked in the instruction fetch pipeline by a completely different thread being stalled. Similarly, such blocked thread occurrences may, therefore, reduce the effective performance of the instruction fetch pipeline.

Since branch prediction may also effect the efficiency of the instruction fetch pipeline, it may be beneficial to both branch prediction and instruction fetching to prevent blocked thread occurrences in the branch prediction pipeline. For the purpose of the present discussion, specific details as to particular branch prediction schemes are not necessary to the understanding of present embodiments of the invention. Further details of such branch prediction schemes may be found in the following published patent applications: 20050149707, 20050138341, 20050132174, 20050071614, 20040193857, 20030018883, 20020087852 and 20020087850. At least one aspect of a branch prediction scheme that may affect attempts to prevent blocked thread occurrences is called dynamic loop prediction.

A loop predictor may try to dynamically predict the number of iterations a loop will execute. It counts each iteration that it predicts a taken branch for the loop and when it has counted the predicted number of iterations it then predicts a non-taken branch to end the loop. Consequently, if the branch prediction pipeline stalls while trying to store a prediction to the prediction output queue, it cannot be restarted without throwing off the iteration count or having some way of dynamically backing up the loop predictor. Thus, it is desirable to assure that the branch prediction pipeline will not stall while trying to store a prediction to the prediction output queue.

Preventing the pipeline from stalling in the stage that stores a prediction to the prediction output queue has the added benefit of more efficiently consuming power than restarting the pipeline. Since the predictions are already formed and correct, it would be inefficient to power the structures again to reform the exact same predictions. Therefore, in general, it may be desirable to prevent stalling a pipeline structure rather than restarting it whenever such prevention is possible.

Figure 3:
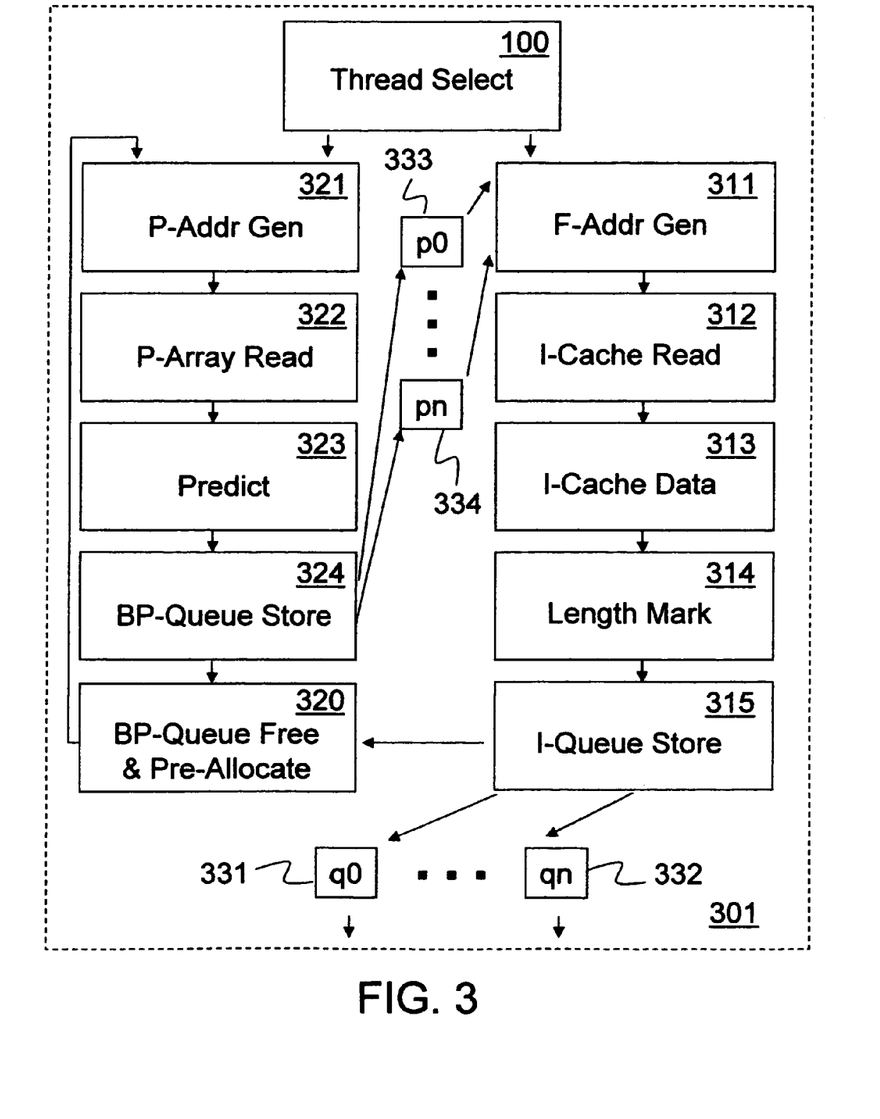
FIG. 3 illustrates one embodiment of an apparatus to support pipelined branch prediction and instruction fetching of multiple execution threads.

FIG. 3 illustrates one embodiment of an apparatus 301 to support pipelined branch prediction and instruction fetching of multiple execution threads. One embodiment of apparatus 301 includes pipelined branch prediction to prevent blocked thread occurrences, such as example 201 shown in FIG. 2a, in pipelined branch prediction of multiple execution threads. The pipelined branch prediction of apparatus 301 comprises pipeline stage 100 to select an execution thread from a plurality of execution threads and pipeline stage 320 to free any storage in branch prediction output queues 333-334 corresponding to instruction data being stored in pipeline stage 315 to instruction fetch output queues 331-332. Pipeline stage 320 is also to pre-allocate storage in branch prediction output queues 333-334 corresponding to a portion of the selected execution thread. Branch prediction output queue 333 holds predictions, p0, corresponding to thread 0. Branch prediction output queue 334 holds predictions, pn, corresponding to thread n.

Embodiments of the pipelined branch prediction of apparatus 301 may also comprise pipeline stage 321 to generate a prediction address corresponding to the portion of the selected execution thread, pipeline stage 322 to read the prediction array data for the prediction address, pipeline stage 323 to generate a branch prediction corresponding to the portion of the selected execution thread; and pipeline stage 324 to store the branch prediction at the pre-allocated storage in the branch prediction output queues 333-334.

It will be appreciated that since storage in the branch prediction output queues 333-334 was pre-allocated in pipeline stage 320, storage of the branch prediction corresponding to the portion of the selected execution thread will not stall in pipeline stage 324 and hence will not block progress of pipeline stages 322-323.

Embodiments of the pipelined instruction fetching of apparatus 301 may also comprise pipeline stage 311 to generate a fetch address corresponding to a portion of the selected execution thread; pipeline stage 312 to access instruction data at the fetch address corresponding to the portion of the selected execution thread, pipeline stage 313 to receive instruction data for the fetch address, pipeline stage 314 to mark a length corresponding to the portion of the selected execution thread, and pipeline stage 315 to store the instruction data at a storage location corresponding to the portion of the selected execution thread in instruction fetch output queues 331-332 if sufficient storage is available.

It will be appreciated that if sufficient storage is not available, the pipelined instruction fetching of apparatus 301 may stall in pipeline stage 315 until sufficient storage in the instruction fetch output queues 331-332 corresponding to the selected execution thread becomes available. If there are no other execution threads in the instruction fetch pipeline having sufficient storage to store instruction data in the instruction fetch output queues 331-332, then the stalling in pipeline stage 315 is not problematic.

On the other hand, if there is another execution thread in the instruction fetch pipeline having sufficient storage to store instruction data in the instruction fetch output queues 331-332, then that thread would be unnecessarily blocked by stalling the instruction fetch pipeline in pipeline stage 315.

Pre-allocating storage in the instruction fetch output queue is problematic. The instruction data corresponding to the portion of the selected execution thread may contain a variable number of instructions. For some embodiments the instructions may have a variable length. Thus, predicting how many instructions will be found in a block (e.g. 16 bytes) of data in order to pre-allocating storage and guarantee that the instruction fetch pipeline will not stall while trying to store the instruction data to the instruction fetch output queue, as in the branch prediction pipeline, is not nearly as effective.

If there is insufficient room in an instruction fetch output queue for a particular thread, it means that the decoders need some time to process the instructions already in the queue before it will be ready to accept more instruction data for that thread. Thus, there is sufficient time to refetch instruction data for that thread. What is desirable, then, is to permit any potentially blocked threads to progress through the instruction fetch pipeline and bypass the thread that is stalled.

Figure 4:
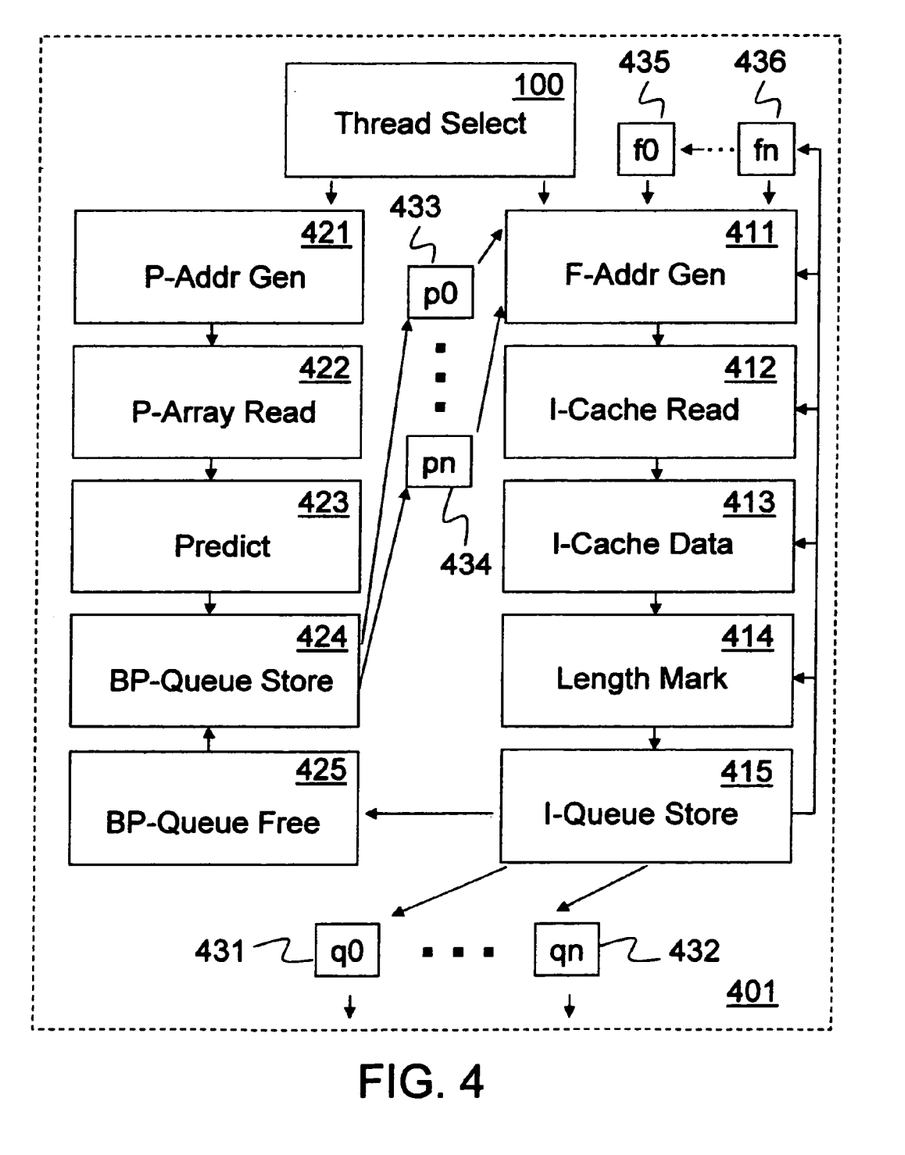
FIG. 4 illustrates an alternative embodiment of an apparatus to support pipelined branch prediction and instruction fetching of multiple execution threads.

FIG. 4 illustrates an alternative embodiment of an apparatus 401 to support pipelined branch prediction and instruction fetching of multiple execution threads. One embodiment of apparatus 401 includes pipelined instruction fetching to avoid blocked thread occurrences, such as example 202 shown in FIG. 2b, in pipelined instruction fetching of multiple execution threads. The pipelined instruction fetching of apparatus 401 comprises pipeline stage 100 to select an execution thread from a plurality of execution threads, pipeline stage 411 to generate a fetch address corresponding to a portion of the selected execution thread; pipeline stage 412 to access instruction data at the fetch address corresponding to the portion of the selected execution thread, pipeline stage 413 to receive instruction data for the fetch address; pipeline stage 414 to mark a length corresponding to the portion of the selected execution thread, and pipeline stage 415 to store the instruction data at a storage location corresponding to the portion of the selected execution thread in instruction fetch output queues 431-432 if sufficient storage is available. Instruction fetch output queue 431 holds instructions, q0, corresponding to thread 0. Instruction fetch output queue 432 holds instructions, qn, corresponding to thread n. If sufficient storage is not available and another thread would be unnecessarily blocked by stalling in pipeline stage 415, pipeline stage 415 initiates invalidation of the pipeline stages corresponding to the selected execution thread and refetching of instruction data for the fetch address corresponding to the portion of the selected execution thread.

For one embodiment of the pipelined instruction fetching of apparatus 401 initiating the refetching of instruction data for the fetch address corresponding to the portion of the selected execution thread comprises resetting one of a set of next instruction pointers 435-436 corresponding to the first execution thread. For alternative embodiments of the pipelined instruction fetching of apparatus 401, initiating the refetching of instruction data may be accomplished through modifications to a preexisting branch misprediction mechanism to clear the instruction fetch pipeline.

Embodiments of the pipelined branch prediction of apparatus 401 may also comprise pipeline stage 421 to generate a prediction address corresponding to the portion of the selected execution thread, pipeline stage 422 to read the prediction array data for the prediction address, pipeline stage 423 to generate a branch prediction corresponding to the portion of the selected execution thread; and pipeline stage 424 to store the branch prediction in the branch prediction output queues 433-434. It will be appreciated that since storage in the branch prediction output queues 433-434 is not pre-allocated, the pipelined branch prediction of apparatus 401 may stall in pipeline stage 424 until storage in the branch prediction output queues 433-434 corresponding to the selected execution thread is freed in pipeline stage 425.

In embodiments where pipelined branch prediction and pipelined instruction fetching are decoupled from one another, it is possible to employ techniques described with regard to FIG. 3 together with techniques described with regard to FIG. 4 to support non-blocking pipelined branch prediction and instruction fetching of multiple execution threads.

Figure 5:
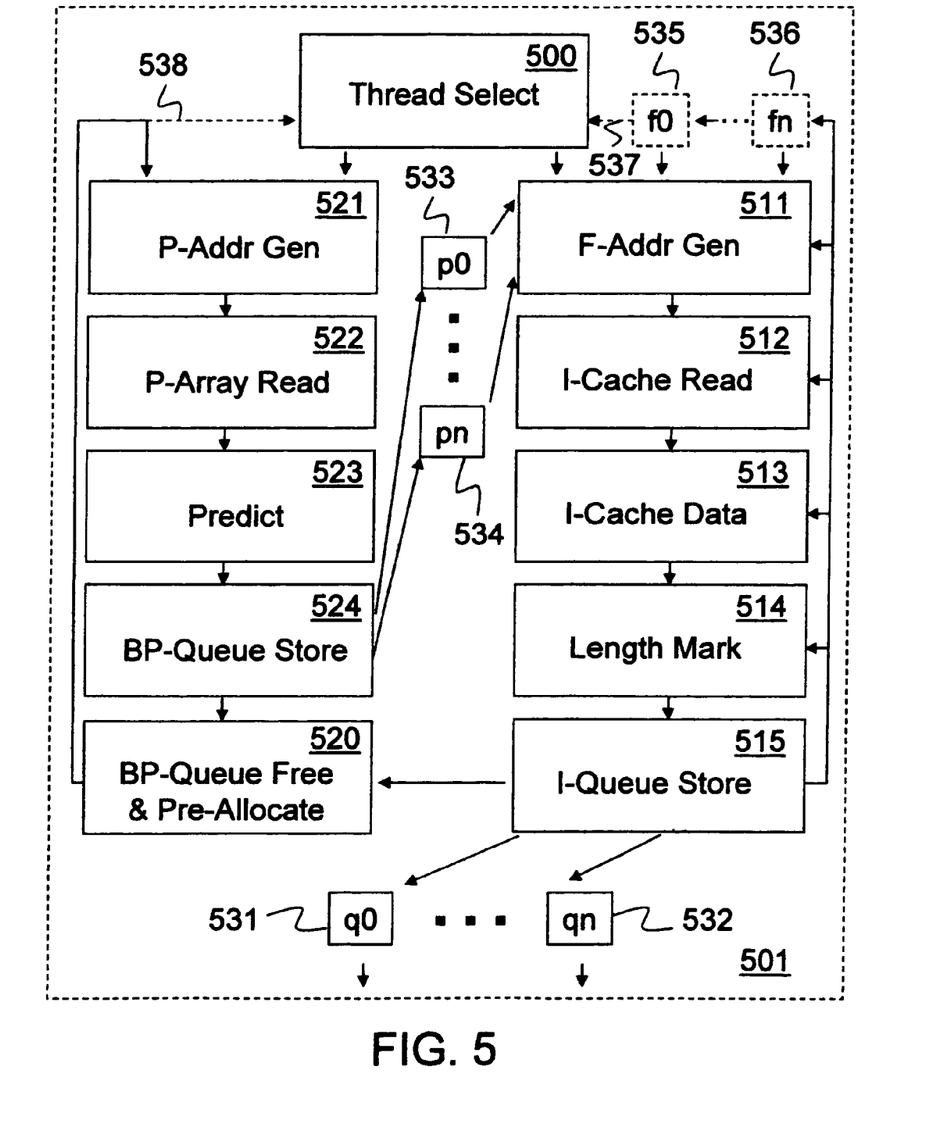
FIG. 5 illustrates another alternative embodiment of an apparatus to support pipelined branch prediction and instruction fetching of multiple execution threads.

FIG. 5 illustrates another alternative embodiment of an apparatus 501 to support pipelined branch prediction and instruction fetching of multiple execution threads.

Embodiments of apparatus 501 may include pipelined branch prediction to prevent blocked thread occurrences in pipelined branch prediction of multiple execution threads. The pipelined branch prediction and instruction fetching of apparatus 501 comprises thread selection pipeline stage 500 to select an execution thread from a plurality of execution threads and branch prediction pipeline stage 520 to free any storage in branch prediction output queues 533-534 corresponding to instruction data being stored in instruction fetch pipeline stage 515 to instruction fetch output queues 531-532. Branch prediction pipeline stage 520 is also to pre-allocate storage in branch prediction output queues 533-534 corresponding to a portion of the selected execution thread.

For one embodiment, branch prediction pipeline stage 520 initiates, via the optional path 538, selection of a another execution thread by thread selection pipeline stage 500 when pre-allocation of storage in the corresponding branch prediction output queue fails. For one alternative embodiment, branch prediction output queue 533 holds predictions, p0, corresponding to thread 0. Branch prediction output queue 534 holds predictions, pn, corresponding to thread n.

Embodiments of apparatus 501 also include pipelined instruction fetching to prevent blocked thread occurrences in pipelined instruction fetching of multiple execution threads. The pipelined branch prediction and instruction fetching of apparatus 501 comprises at least instruction fetch pipeline stage 512 to fetch instruction data at a fetch address corresponding to the portion of the selected execution thread, and instruction fetch pipeline stage 515 to store the instruction data at a storage location corresponding to the portion of the selected execution thread in instruction fetch output queues 531-532 if sufficient storage is available. If sufficient storage is not available and another thread would be unnecessarily blocked by stalling in pipeline stage 515, instruction fetch pipeline stage 515 initiates invalidation of the pipeline stages corresponding to the selected execution thread and refetching of instruction data for the fetch address corresponding to the portion of the selected execution thread.

For one embodiment of the pipelined instruction fetching of apparatus 501 initiating the refetching of instruction data for the fetch address corresponding to the portion of the selected execution thread comprises resetting one of a set of optional next instruction pointers 535-536 corresponding to the first execution thread. For an alternative embodiment the set of optional next instruction pointers 535-536 may be included in thread selection pipeline stage 500. For another alternative embodiment, instruction fetch pipeline stage 515 initiates the optional selection of a another execution thread by thread selection pipeline stage 500 when sufficient storage for the corresponding instruction fetch output queue is not available. In some embodiments thread selection pipeline stage 500 may independently select another execution thread either for the instruction fetch pipeline, or for the branch prediction pipeline.

For one embodiment of the pipelined instruction fetching of apparatus 501 instruction fetch output queue 531 holds instructions, q0, corresponding to thread 0. Instruction fetch output queue 532 holds instructions, qn, corresponding to thread n.

It will be appreciated that embodiments of the pipelined instruction fetching of apparatus 501 may further comprise instruction fetch pipeline stage 511 to generate a fetch address corresponding to a portion of the selected execution thread, instruction fetch pipeline stage 513 to receive instruction data for the fetch address, and instruction fetch pipeline stage 514 to mark a length corresponding to the portion of the selected execution thread. It will also be appreciated that the illustrated pipelines may be simplified in order to provide a clear example and to avoid unnecessarily obscuring embodiments of the invention. Not all of the illustrated pipeline stages are deemed necessary to some embodiments of apparatus 501. Further, an illustrated pipeline stage may represent multiple actual pipeline stages or two or more illustrated pipeline stages may be combined into the same pipeline stage in a particular implementation or embodiment.

Similarly, embodiments of the pipelined branch prediction of apparatus 501 may also comprise branch prediction pipeline stage 521 to generate a prediction address corresponding to the portion of the selected execution thread, branch prediction pipeline stage 522 to read the prediction array data for the prediction address, branch prediction pipeline stage 523 to generate a branch prediction corresponding to the portion of the selected execution thread; and branch prediction pipeline stage 524 to store the branch prediction at the pre-allocated storage in the branch prediction output queues 533-534.

It will be appreciated that since storage in the branch prediction output queues 533-534 was pre-allocated in branch prediction pipeline stage 520, storage of the branch prediction corresponding to the portion of the selected execution thread will not stall in pipeline stage 524 and hence will prevent stalling of subsequent stages 522-523 in the branch prediction pipeline.

Figure 6A:
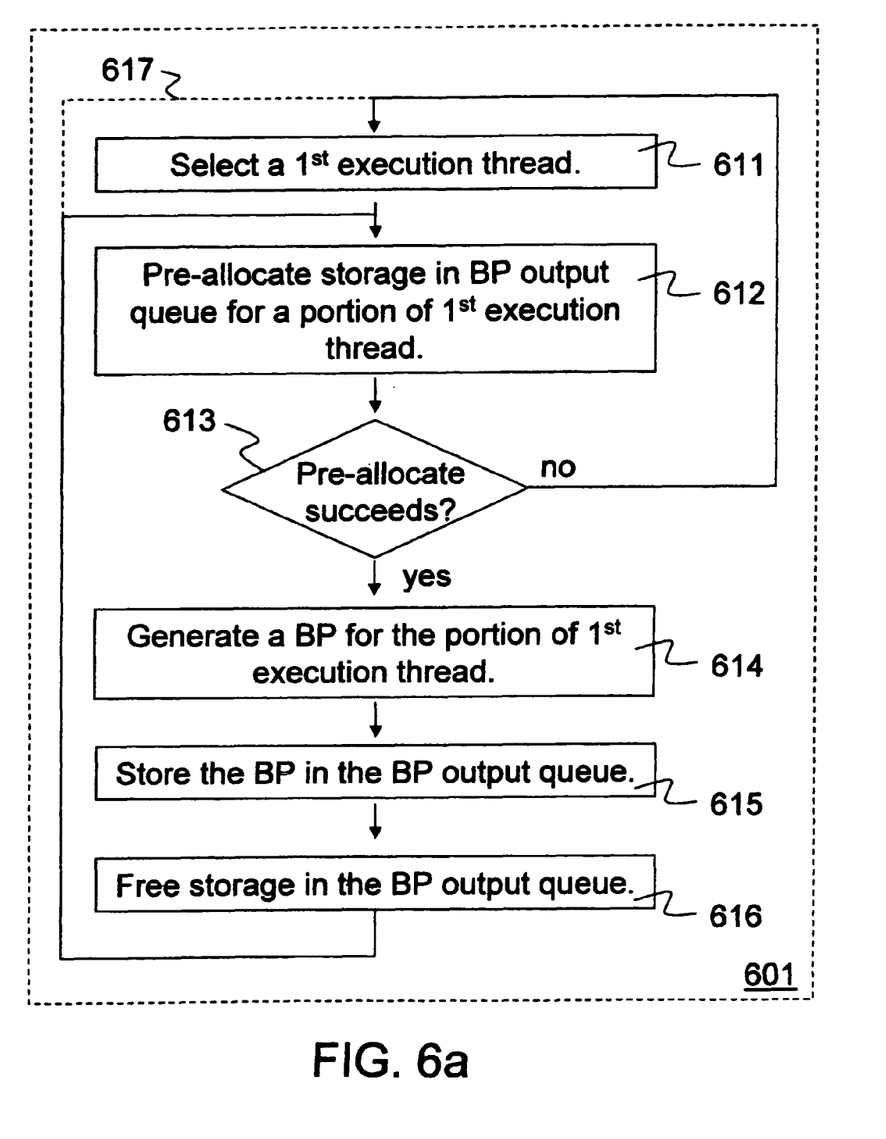
FIG. 6a illustrates a flow diagram for one embodiment of a process for pipelined branch prediction of multiple execution threads.

FIG. 6a illustrates a flow diagram for one embodiment of a process 601 for pipelined branch prediction of multiple execution threads. Process 601 and other processes herein disclosed are performed by processing blocks that may comprise dedicated hardware or software or firmware operation codes executable by general purpose machines or by special purpose machines or by a combination of both.

Process 601 begins in processing block 611 where a first execution thread is selected from a plurality of execution threads. Processing continues in processing block 612 where storage is pre-allocated in a branch prediction output queue for a portion of the first execution thread. In processing block 613 a determination whether the pre-allocation of processing block 612 succeeded. If not, processing returns to processing block 611. Otherwise, processing proceeds to processing block 614 where, a branch prediction corresponding to said portion of the first execution thread is generated and next in processing block 615 where the branch prediction is stored at the pre-allocated storage in the branch prediction output queue, and eventually to processing block 616 where storage in the branch prediction output queue is freed responsive to the corresponding instruction data being stored to an instruction fetch output queue. From processing block 616, processing may proceed in processing block 612 or optionally in processing block 611.

Figure 6B:
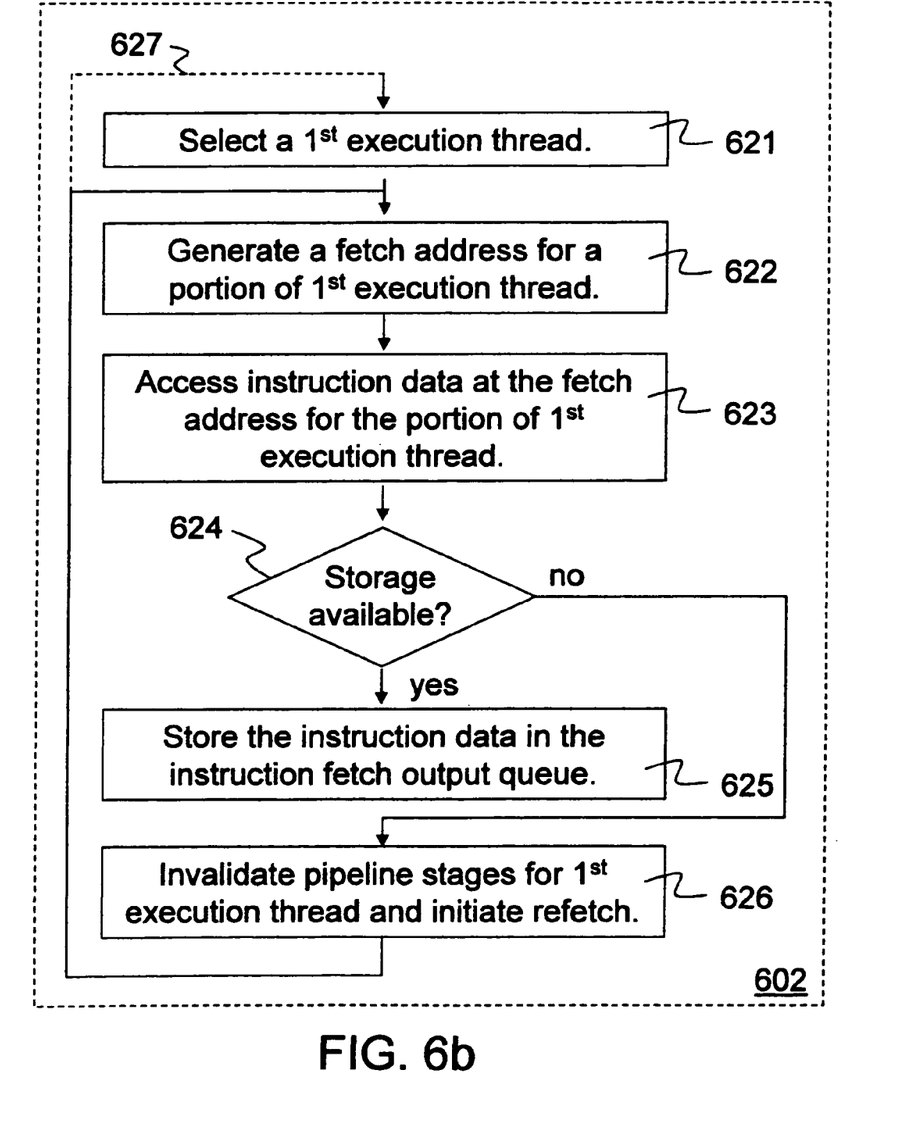
FIG. 6b illustrates a flow diagram for one embodiment of a process for pipelined instruction fetching of multiple execution threads.

FIG. 6b illustrates a flow diagram for one embodiment of a process 602 for pipelined instruction fetching of multiple execution threads. Processing begins in processing block 621 where a first execution thread is selected from a plurality of execution threads. Processing continues in processing block 622 where a fetch address corresponding to a portion of the first execution thread is generated. Processing then proceeds to processing block 623 where instruction data is accessed at the fetch address corresponding to said portion of the first execution thread. In processing block 624, if sufficient storage is available then processing proceeds in processing block 625 where the instruction data is stored at a first storage location corresponding to a portion of the first execution thread in an instruction fetch output queue. Otherwise, in processing block 626 one or more pipeline stages corresponding to the first execution thread are invalidated and a refetching is initiated for the address corresponding to the portion of the first execution thread, which returns processing to processing block 622 or optionally to processing block 627.

It will be appreciated that it is possible to employ techniques described with regard to process 601 of FIG. 6a together with techniques described with regard to process 602 of FIG. 6b to prevent blocked thread occurrences in pipelined branch prediction of and to avoid blocked thread occurrences in pipelined instruction fetching of multiple execution threads.

Figure 7:
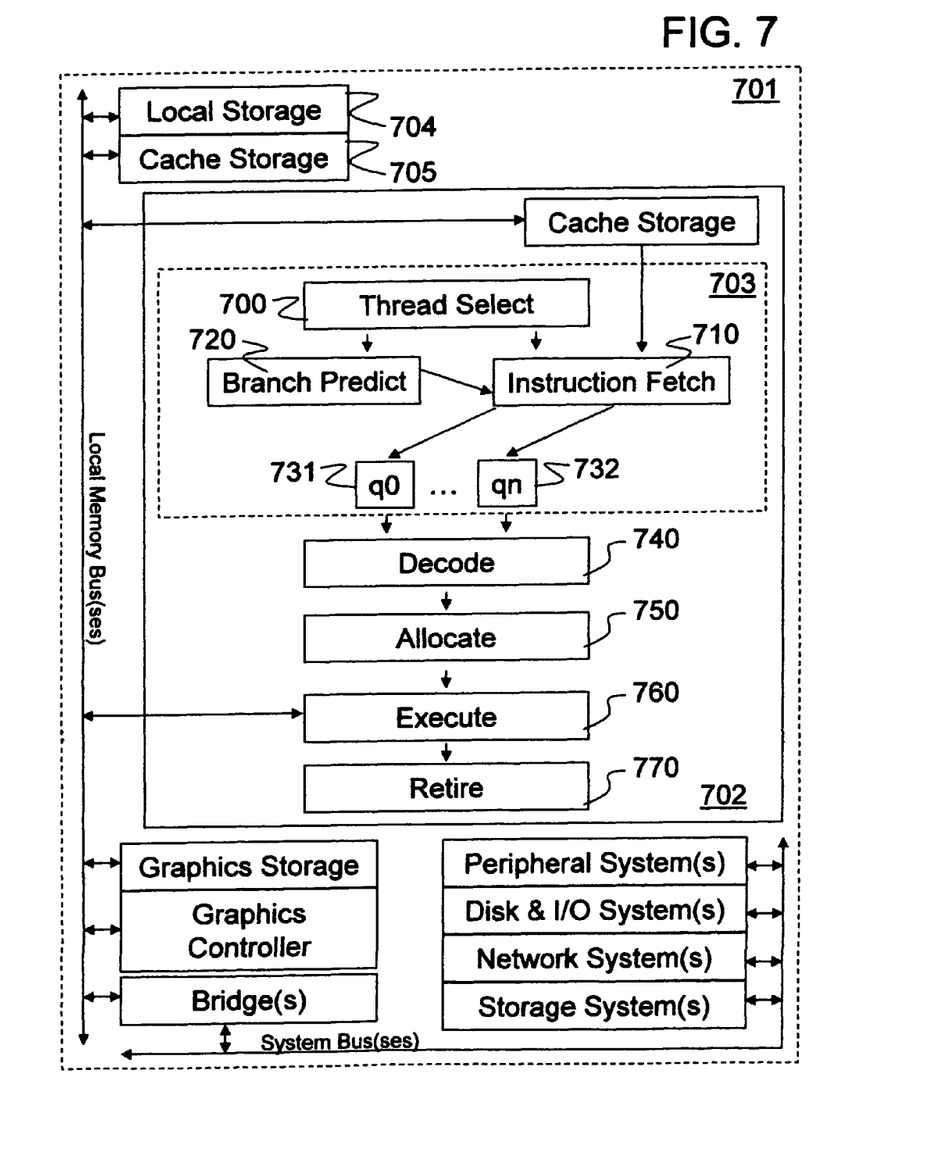
FIG. 7 illustrates one embodiment of a computing system to support pipelined branch prediction and instruction fetching of multiple execution threads.

FIG. 7 illustrates one embodiment of a multithreaded computing system 701 to support pipelined branch prediction and instruction fetching of multiple execution threads. Computing system 701 may include an addressable memory, local storage 704, and cache storage 705 to store data, graphics storage and a graphics controller, and various systems optionally including peripheral systems, disk and I/O systems, network systems including network interfaces to stream data for storage in addressable memory, and external storage systems including magnetic storage devices to store instructions of multiple execution threads, wherein the instructions being accessed by the processor 702, cause the processor to process the instructions including pipelined branch prediction and instruction fetching of the multiple execution threads.

Embodiments of processor 702 may include pipelined branch prediction and instruction fetching logic 703 comprising a thread selection pipeline stage 700 to select an execution thread from a plurality of execution threads, a branch prediction pipeline 720 to pre-allocate storage in a branch prediction output queue, the pre-allocation of storage corresponding to a portion of the selected execution thread in order to prevent stalling of subsequent stages in the branch prediction pipeline 720. Pipelined branch prediction and instruction fetching logic 703 further comprises a first instruction fetch pipeline 710 to fetch instruction data at a fetch address corresponding to a portion of the selected execution thread and to store the instruction data at a storage location corresponding to the portion of the selected execution thread in instruction fetch output queues 731-732 if the storage location is available. If the storage location is not available, instruction fetch pipeline 710 initiates invalidation of instruction fetch pipeline stages corresponding to the selected execution thread and refetches the instruction data at that fetch address in order to avoid stalling of a preceding stage in instruction fetch pipeline 710.

Embodiments of processor 702 may also include decode logic 740 to decode instructions in instruction fetch output queues 731-732 according to a sequential instruction ordering into micro-operations representing the sequential instruction ordering, allocation logic 750 to allocate execution resources to micro-operations, execution logic 760 to execute the micro-operations and retirement logic 770 to retire the micro-operations in accordance with the sequential instruction ordering they represent. For some embodiments of processor 702, retirement logic 770 may be coupled with branch prediction pipeline 720 to update a dynamic prediction for a micro-operation as it is retired.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A computer implemented method for pipelined branch prediction of multiple threads, the method comprising:
selecting, in a first pipeline stage, a first execution thread from a plurality of execution threads;
prior to storage, allocating and thereby setting aside for future data storage, in a second pipeline stage, storage in a branch prediction output queue shared by the plurality of execution threads to be used to store a branch prediction at a later point in time, wherein the branch prediction is not generated within the second pipeline stage, said storage corresponding to a portion of the first execution thread and freeing, in said second pipeline stage, storage in the branch prediction output queue to be potentially used in a different pipeline stage;

preventing progression of said first execution thread to said third pipeline stage unless the pre-allocating of storage in the branch prediction output queue succeeds in the second pipeline stage, wherein a second execution thread is permitted to bypass the first execution thread that is prevented from progressing;

generating, in a third pipeline stage, a branch prediction corresponding to said portion of the first execution thread; and storing, in a fourth pipeline stage, the branch prediction at said allocated storage in the branch prediction output queue, wherein the first through fourth pipeline stages are distinct pipeline stages.

2. The method of claim 1 further comprising:
responsive to a failure of the freeing of storage and/or the pre-allocating of storage corresponding to the portion of the first execution thread, pre-allocating, in said second pipeline stage, storage in the branch prediction output queue, said storage corresponding to a portion of the second execution thread.

3. The method of claim 1, wherein the order of the pipeline states is first, second, and then third.

4. The method of claim 1, further comprising:
generating a fetch address corresponding to a portion of the selected execution thread in a fourth pipeline stage;
accessing instruction data at the fetch address corresponding to the portion of the selected execution thread in a fifth pipeline stage;
receiving instruction data for the fetch address in a sixth pipeline stage;
marking a length corresponding to the portion of the selected execution thread in a seventh pipeline stage; and
storing the instruction data at a storage location corresponding to the portion of the selected execution thread in instruction fetch output queues if sufficient storage is available in an eighth pipeline stage.

5. A pipelined branch prediction apparatus comprising:
a first pipeline stage to select a first execution thread from a plurality of execution threads;
a second pipeline stage to allocate and thereby reserve storage in a branch prediction output queue used by the plurality of execution threads to be used to store a branch prediction at a later point in time that is not within the second pipeline stage, said storage corresponding to a portion of the first execution thread, wherein said second pipeline stage is further to free storage in the branch prediction output queue responsive to storing instruction data corresponding to the portion of the first execution thread in an instruction fetch output queue, wherein the first execution thread is stalled unless the allocation of storage in the branch prediction output queue succeeds and wherein a second execution thread is permitted to bypass the first execution thread that is stalled;
a third pipeline stage to generate a branch prediction corresponding to said portion of the first execution thread; and
a fourth pipeline stage to store the branch prediction at said allocated storage in the branch prediction output queue, wherein the first through fourth pipeline stages are distinct pipeline stages.

6. The apparatus of claim 5 wherein progression of said first execution thread to said third pipeline stage is prevented unless the freeing of storage and/or the pre-allocating of storage in the branch prediction output queue succeeds in the second pipeline stage.

7. The apparatus of claim 6 wherein responsive to a failure of the freeing of storage and/or the pre-allocating of storage corresponding to the portion of the first execution thread, said second pipeline stage is to pre-allocate storage in the branch prediction output queue corresponding to a portion of the second execution thread.

8. The apparatus of claim 5 wherein responsive to a failure of the freeing of storage and/or the pre-allocating of storage corresponding to the portion of the first execution thread, said first pipeline stage is to select the second execution thread from the plurality of execution threads.

9. A multithreaded processor with multithread branch prediction logic comprising:
means for selecting a first execution thread from a plurality of execution threads;
means for allocating and thereby reserving storage in a branch prediction output queue corresponding to a portion of the first execution thread;
means for freeing storage in the branch prediction output queue to be used at a later point in time responsive to a storing of instruction data of the first execution thread in an instruction fetch output queue;
means for stalling said first execution thread unless the allocating of storage in the branch prediction output queue succeeds and for permitting a second execution thread to bypass the first execution thread that is stalled from progressing.

10. The multithreaded processor of claim 9, said multithread branch prediction logic further comprising:
means for generating a branch prediction corresponding to said portion of the first execution thread and storing the branch prediction at said pre-allocated storage in the branch prediction output queue.

11. The multithreaded processor of claim 9, said multithread branch prediction logic further comprising:
means for selecting the second execution thread from the plurality of execution threads responsive to a failure of the freeing of storage and/or the pre-allocating of storage corresponding to the portion of the first execution thread; and
means for pre-allocating storage in the branch prediction output queue corresponding to a portion of the second execution thread.

12. A multithreaded computing system comprising:
an addressable memory to store data;
a processor including pipelined branch prediction logic comprising:
a thread selection pipeline stage to select a first execution thread from a plurality of execution threads;
a first prediction pipeline stage to allocate and reserve storage in a branch prediction output queue corresponding to a first portion of the first execution thread and to free storage in the branch prediction output queue to be used later and not to be used in the first prediction pipeline stage responsive to a storing of instruction data corresponding to the first portion of the first execution thread in an instruction fetch output queue, wherein the first execution thread is stalled unless the allocation of storage in the branch prediction output queue succeeds and wherein a second execution thread is permitted to bypass the first execution thread that is stalled;

a second prediction pipeline stage to generate a branch prediction corresponding to said first portion of the first execution thread; and a third prediction pipeline stage to store the branch prediction at said allocated storage in the branch prediction output queue wherein the first through third prediction pipeline stages are distinct pipeline stages; and further including pipelined instruction fetch logic to access the instruction data corresponding to the first portion of the first execution thread stored by the addressable memory and to store said instruction data in the instruction fetch output queue; and a magnetic storage device; and a network interface.

13. The computing system of claim 12 wherein progression of said first execution thread to said second prediction pipeline stage is prevented unless the freeing of storage and/or the pre-allocating of storage in the branch prediction output queue succeeds in the first prediction pipeline stage of the pipelined branch prediction logic.

14. The computing system of claim 12 wherein said pipelined instruction fetch logic is further to initiate an invalidation of one or more instruction fetch pipeline stages corresponding to the first execution thread and a refetching of the fetch address corresponding to the first portion of the first execution thread if it is unable to store said instruction data in the instruction fetch output queue.

15. An apparatus for pipelined branch prediction and instruction fetching of multiple execution threads, the apparatus comprising:

a thread selection pipeline stage to select a first execution thread from a plurality of execution threads;

a first branch prediction pipeline stage to allocate and thereby reserve a first storage location in a branch prediction output queue to be used in a different pipeline stage, the allocation of said a first storage location corresponding to a portion of the first execution thread, wherein the first execution thread is stalled unless the allocation of the first storage location in the branch prediction output queue succeeds and wherein a second execution thread is permitted to bypass the first execution thread that is stalled;

a first instruction fetch pipeline stage to fetch instruction data at a fetch address corresponding to said portion of the first execution thread; and a second instruction fetch pipeline stage to store the instruction data at a second storage location corresponding to the portion of the first execution thread in an instruction fetch output queue if said second storage location is available, or else to initiate an invalidation of one or more instruction fetch pipeline stages corresponding to the first execution thread and a refetching of said fetch address if said second storage location is not available in order to avoid stalling of a preceding stage in the instruction fetch pipeline.

16. The apparatus of claim 15 wherein said first branch prediction pipeline stage stalls responsive to an unavailability of said first storage location corresponding to the first execution thread.

17. The apparatus of claim 15 wherein responsive to an unavailability of said first storage location corresponding to the first execution thread, said thread selection pipeline stage selects the second execution thread from the plurality of execution threads.

18. The apparatus of claim 15 wherein responsive to an unavailability of said second storage location corresponding to the first execution thread, said thread selection pipeline stage selects the second execution thread from the plurality of execution threads.

19. The apparatus of claim 15 wherein initiating a refetching of the fetch address corresponding to said portion of the first execution thread comprises resetting a next instruction pointer for the first execution thread.

20. The apparatus of claim 15 wherein the invalidation of said one or more pipeline stages corresponding to the first execution thread permits progression of the second execution thread in the preceding stage of the instruction fetch pipeline.

21. The apparatus of claim 15 wherein said first branch prediction pipeline stage is further to free the first storage location in the branch prediction output queue.

22. The apparatus of claim 21 wherein said first execution thread stalls in said first branch prediction pipeline stage unless the freeing of the first storage location and/or the pre-allocating of the first storage location in the branch prediction output queue succeeds.

23. The apparatus of claim 21 wherein responsive to a failure of the freeing of the first storage location and/or the pre-allocating of the first storage location corresponding to the portion of the first execution thread, said first branch prediction pipeline stage pre-allocates a third storage location in the branch prediction output queue, said third storage location corresponding to a portion of the second execution thread.

* * * * *